(12) United States Patent
Chin et al.

(10) Patent No.: US 7,113,239 B2
(45) Date of Patent: Sep. 26, 2006

(54) LIQUID CRYSTAL DISPLAY DEVICE HAVING MULTI-DOMAIN STRUCTURE INCLUDING A DISTORTING PATTERN UNDER THE PIXEL ELECTRODE AND METHOD OF FABRICATING THE SAME

(75) Inventors: Gyo-Won Chin, Seoul (KR); Do-Sung Kim, Gyeongsangbuk-do (KR); Jeong-Ki Kim, Dae-gu (KR); Hyung-Beom Shin, Gyeongsangbuk-do (KR); Do-Yeon Kim, Busan (KR)

(73) Assignee: LG. Philips LCD Co., Ltd., Seoul (KR)

( * ) Notice: Subject to any disclaimer, the term of this patent is extended or adjusted under 35 U.S.C. 154(b) by 114 days.

(21) Appl. No.: 10/862,537

(22) Filed: Jun. 8, 2004

(65) Prior Publication Data

US 2004/0257513 A1 Dec. 23, 2004

(30) Foreign Application Priority Data

Jun. 9, 2003 (KR) ...................... 10-2003-0036876

(51) Int. Cl.
*G02F 1/1337* (2006.01)
*G02F 1/1333* (2006.01)

(52) U.S. Cl. ........................ 349/129; 349/122; 349/138
(58) Field of Classification Search ................ 349/129, 349/38, 122, 138; 257/59, 72
See application file for complete search history.

(56) References Cited

U.S. PATENT DOCUMENTS

| | | | | |
|---|---|---|---|---|
| 6,657,695 B1* | 12/2003 | Song et al. | .................. | 349/143 |
| 6,757,040 B1* | 6/2004 | Kim et al. | .................. | 349/129 |
| 2001/0030717 A1* | 10/2001 | Kaneko et al. | ................ | 343/43 |
| 2003/0112397 A1* | 6/2003 | Lee | ............................ | 349/129 |
| 2004/0119898 A1* | 6/2004 | Song | ........................... | 349/38 |
| 2004/0125253 A1* | 7/2004 | Kim et al. | ..................... | 349/43 |

\* cited by examiner

*Primary Examiner*—Tarifur R. Chowdhury
(74) *Attorney, Agent, or Firm*—McKenna Long & Aldridge LLP

(57) ABSTRACT

An array substrate for a liquid crystal display device includes a gate line and a data line on a substrate, the gate line crossing the data line to define a pixel region, a thin film transistor connected to the gate line and the data line, a pixel electrode connected to the thin film transistor, and a distortion pattern under the pixel electrode.

28 Claims, 18 Drawing Sheets

US 7,113,239 B2

LIQUID CRYSTAL DISPLAY DEVICE HAVING MULTI-DOMAIN STRUCTURE INCLUDING A DISTORTING PATTERN UNDER THE PIXEL ELECTRODE AND METHOD OF FABRICATING THE SAME

The present invention claims the benefit of Korean Patent Application No. 2003-0036876, filed in Korea on Jun. 9, 2003, which is hereby incorporated by reference.

BACKGROUND OF THE INVENTION

1. Field of the Invention

The present invention relates to a liquid crystal display (LCD) device, and more particularly, to an LCD device having a multi-domain structure.

2. Discussion of the Related Art

In general, an LCD device includes two substrates disposed to have their respective electrodes facing each other, and a liquid crystal layer is interposed between the respective electrodes. When a voltage is applied to the electrodes, an electric field is generated between the electrodes to modulate light transmittance of the liquid crystal layer by reorienting liquid crystal molecules, thereby displaying images.

There are many types of LCDs, one of which is an active matrix LCD (AM-LCD) that includes a matrix array of pixels, wherein each of the pixels in the AM-LCD has a thin film transistor (TFT) and a pixel electrode. The AM-LCD has high resolution and superiority in displaying moving images.

FIG. 1A is a schematic plan view of an array substrate for a LCD device according to the related art, and FIG. 1B is a schematic plan view of a color filter substrate for the LCD device of FIG. 1A. In FIG. 1A, a gate line 14 is formed along a first direction and a data line 24 is formed along a second direction perpendicular to the first direction. A pixel region "P" is defined by the crossing of the gate line 14 and the data line 24, a TFT "T" is connected to the gate line 14 and the data line 24, and a pixel electrode 28 is formed in the pixel region "P" and connected to the TFT "T." The TFT "T" includes a gate electrode 12 that extends from the gate line 14, a source electrode 20 that extends from the data line 24, a drain electrode 22 that is spaced apart from the source electrode 20, and a semiconductor layer 18 that overlaps the source and drain electrodes 20 and 22. In addition, a first orientation film 30 is formed on the pixel electrode 28 to induce an initial alignment of a liquid crystal layer (not shown).

In FIG. 1B, a black matrix 52 is formed at a peripheral portion of the pixel region "P" and has an open portion corresponding to the pixel region "P." In addition, a color filter layer 54 is formed in the pixel region "P" and includes red, green, and blue sub-color filters 54a, 54b, and 54c, wherein each of the sub-color filters 54a, 54b, and 54c corresponds to one pixel region "P." Then, a common electrode 56 and a second orientation film 58 are sequentially formed on the color filter layer 54.

FIG. 2 is a schematic cross-sectional views, along II—II of FIGS. 1A and 1B, showing the LCD device according to the related art. In FIG. 2, first and second substrates 10 and 50 are spaced apart and face from each other, and a liquid crystal layer 70 is interposed between the first and second substrates 10 and 50. A first orientation film 30 is formed between the liquid crystal layer 70 and the first substrate 10, and a second orientation film 58 is formed between the liquid crystal layer 70 and the second substrate 50. The liquid crystal layer 70 has a twisted nematic (TN) mode, where liquid crystal molecules 72 have a 90° twisted structure without an applied voltage and are aligned orthogonal to the first and second substrates 10 and 50 with an applied voltage. The first and second orientation films 30 and 58 are rubbed along opposing directions.

When an electric field is induced to the liquid crystal layer 70, the liquid crystal molecules 72 in the pixel region "P" are aligned along one direction orthogonal to the first and second substrates 10 and 50. Thus, a first light beam "L1" controlled by a long axis of the liquid crystal molecules 72 and a second light beam "L2" controlled by a short axis of the liquid crystal molecules 72 are emitted according to a viewing angle. Since the first and second light beams "L1" and "L2" have different intensities, a user observes non-uniform brightness of the LCD device, thereby creating a narrow viewing angle.

In order to solve these problems, the LCD device is provided with a multi-domain structure where an alignment state of the liquid crystal molecules is symmetrically divided in each pixel region. The multi-domain structure for the TN mode LCD device is obtained by adjusting a rubbing direction of an orientation film or by distorting an electric field. In the multi-domain structure using a distorted electric field, an alignment state of the liquid crystal molecules is stabilized to the multi-domain structure by generating a fringe electric field.

FIG. 3A is a schematic plan view of an array substrate for an LCD device having a 2-domain structure according to the related art. FIG. 3B is a schematic plan view of a color filter substrate for the LCD device of FIG. 3A according to the related art. In FIG. 3A, a gate line 114 and a data line 124 cross each other, a TFT "T" is connected to the gate line 114 and the data line 124, and a pixel electrode 128 having a slit 127 is connected to the TFT "T." In addition, an auxiliary electrode 113 is provided to overlap the slit 127, and the slit 127 is disposed along a diagonal direction of the pixel electrode 128. For example, the auxiliary electrode 113 is formed of the same material as the gate line 114 through the same process, and is electrically separated from the pixel electrode 128, but is connected to a common line 115. In addition, a first orientation film 130 is formed on the pixel electrode 128.

In FIG. 3B, a black matrix 152 is formed in a peripheral portion of the pixel region "P" and has an open portion corresponding to the pixel region "P." In addition, a color filter layer 154 is formed in the pixel region "P" and includes red, green, and blue sub-color filters 154a, 154b, and 154c, wherein the red, green, and blue sub-color filters 154a, 154b, and 154c are alternately disposed in the pixel region "P." Furthermore, a protrusive pattern 155 is formed in a boundary portion of the pixel region "P," and a common electrode 156 and a second orientation film 158 are sequentially formed on the protrusive pattern 155.

In the LCD device of FIGS. 3A and 3B, the slit 127 of the pixel electrode 128, the auxiliary electrode 113, and the protrusive pattern 155 induce distortion of the electric field to form the 2-domain structure.

FIG. 4 is a schematic cross-sectional view, along IV-IV of FIGS. 3A and 3B showing the LCD having the 2-domain structure according to the related art. In FIG. 4, first and second substrates 110 and 150 are spaced apart from and face each other, and the auxiliary electrode 113 is formed on an inner surface of the first substrate 110 in a central portion of the pixel region "P." Then a gate insulating layer 116 is formed on an entire surface of the first substrate 110. Accordingly, the data line 124 is formed on the gate insulating layer 116 at both sides of the pixel region "P," and a passivation layer 126 is formed on the data line 124. Next, the pixel electrode 128 is formed on the passivation layer in the pixel region "P," wherein the slit 127 corresponds to the auxiliary electrode 113.

Then, a black matrix 152 is formed on an inner surface of the second substrate 150 to correspond to the data line 124, a color filter layer 154 is formed on the black matrix 152, and a common electrode 156 is formed on the color filter layer 154. Next, a protrusive pattern 155 is formed on the common electrode 156 in a boundary portion of the pixel region "P," and the second orientation film 158 is formed on the protrusive pattern 155 and the common electrode 156.

In FIG. 4, a liquid crystal layer 170 is formed between the first and second orientation films 130 and 158. Due to distortion of the electric field by the slit 127 of the pixel electrode 128, the auxiliary electrode 113, and the protrusive pattern 155, the liquid crystal layer 170 has 2 domains of different alignment states utilizing the slit 127 as a border. Since liquid crystal molecules 172 in the adjacent domains have symmetric alignment states, a viewing angle of the LCD device is improved.

However, since the LCD device is fabricated through an attachment process of the first substrate having array elements, such as a TFT, and the second substrate having the color filter layer and includes an injection process of the liquid crystal molecules, misalignment of the protrusive pattern with the boundary portion of the pixel region may occur during the attachment process. Since this misalignment causes light leakage, a sufficient attachment margin is necessary. That may be obtained by increasing a width of the black matrix. However, as the attachment margin increases, aperture ratio decreases. Moreover, since the protrusive pattern is formed through an additional process, a total number of individual fabricating steps increases and production costs also increase.

SUMMARY OF THE INVENTION

Accordingly, the present invention is directed to an LCD device and a method of fabricating the same that substantially obviates one or more of the problems due to limitations and disadvantages of the related art.

An object of the present invention is to provide an LCD device having a multi-domain structure and a method of fabricating the same.

Another object of the present invention is to provide an LCD device having a 2-domain structure where the light leakage due to the misalignment is prevented with high aperture ratio and fabricating steps are reduced, and a method of fabricating the same.

Another object of the present invention is to provide an LCD device having a 2-domain structure where the number of fabricating steps are reduced, and a method of fabricating the same.

Additional features and advantages of the invention will be set forth in the description which follows, and in part will be apparent from the description, or may be learned by practice of the invention. These and other advantages of the invention will be realized and attained by the structure particularly pointed out in the written description and claims thereof as well as the appended drawings.

To achieve these and other advantages and in accordance with the purpose of the present invention, as embodied and broadly described, an array substrate for an LCD device includes a gate line and a data line on a substrate, the gate line crossing the data line to define a pixel region, a thin film transistor connected to the gate line and the data line, a pixel electrode connected to the thin film transistor, and a distortion pattern under the pixel electrode.

In another aspect, an LCD device includes first and second substrates facing to and spaced apart from each other, a gate line and a data line on the first substrate, the gate line crossing the data line to define a pixel region, a thin film transistor connected to the gate line and the data line, a pixel electrode connected to the thin film transistor, a distortion pattern under the pixel electrode, a black matrix on the second substrate, a color filter layer on the black matrix; a common electrode on the color filter layer, and a liquid crystal layer between the pixel electrode and the common electrode.

In another aspect, a method of fabricating an LCD device includes forming a gate line and a data line on a first substrate, the gate line crossing the data line to define a pixel region, forming a thin film transistor connected to the gate line and the data line, forming a pixel electrode connected to the thin film transistor, forming a distortion pattern under the pixel electrode, forming a black matrix on a second substrate, forming a color filter layer on the black matrix, forming a common electrode on the color filter layer, attaching the first and second substrates such that the pixel electrode and the common electrode face each other, and forming a liquid crystal layer between the pixel electrode and the common electrode.

In another aspect, a method of an array substrate for an LCD device includes forming a gate line including a gate electrode, an auxiliary electrode and a first buffer pattern on a substrate, forming a data line including a source electrode, a drain electrode spaced apart from the source electrode and a second buffer pattern corresponding to the first buffer pattern, the data line crossing the gate line to define a pixel region, forming a passivation layer on the data line, the source electrode, the drain electrode and the second buffer pattern, the passivation layer having a drain contact hole exposing the drain electrode, and forming a pixel electrode on the passivation layer, the pixel electrode being connected to the drain electrode through the drain contact hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to the illustrated embodiments of the present invention, an example of which is illustrated in the accompanying drawings.

Figure 1A:
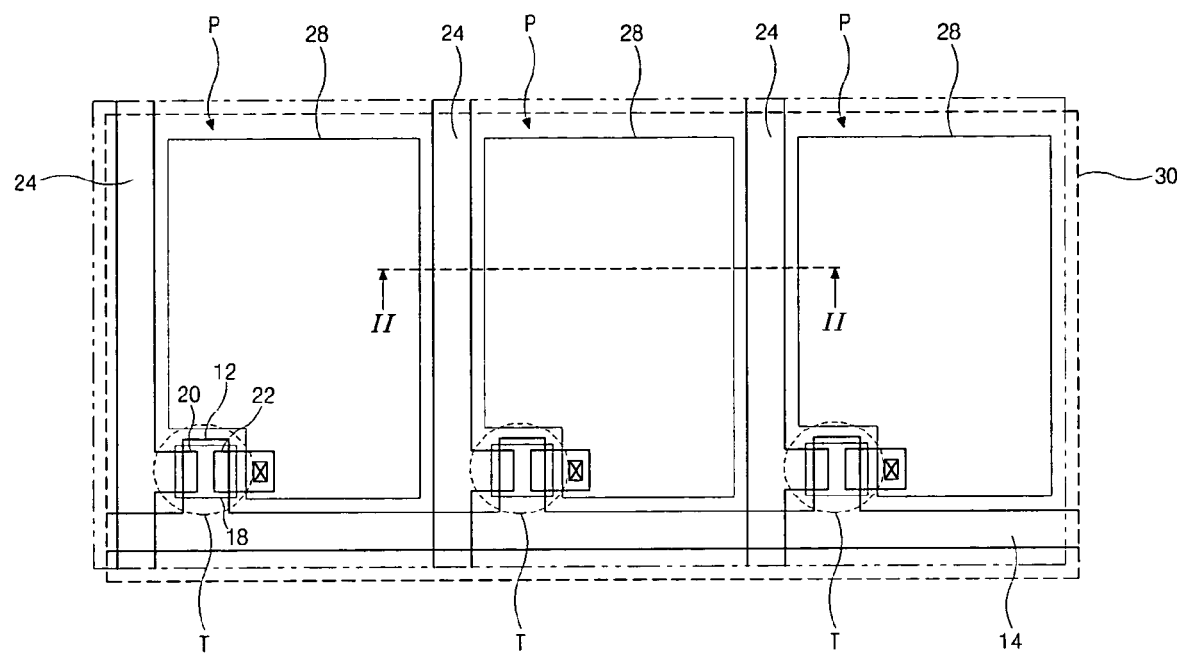
FIG. 1A is a schematic plan view of an array substrate for an LCD device according to the related art.
Figure 1B:
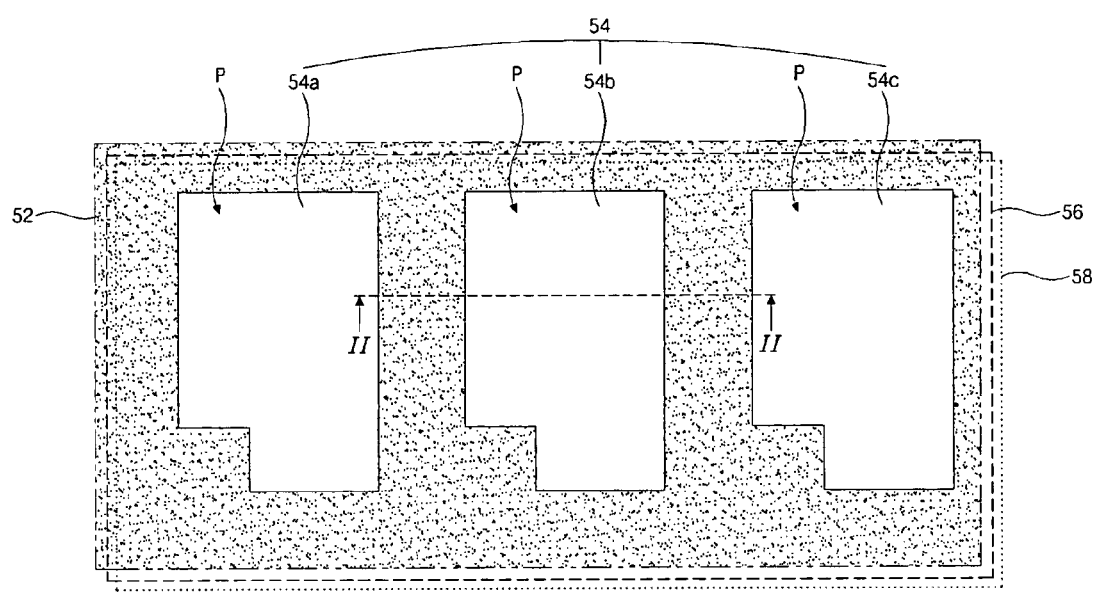
FIG. 1B is a schematic plan view of a color filter substrate for the LCD device of FIG. 1B according to the related art.
Figure 2:
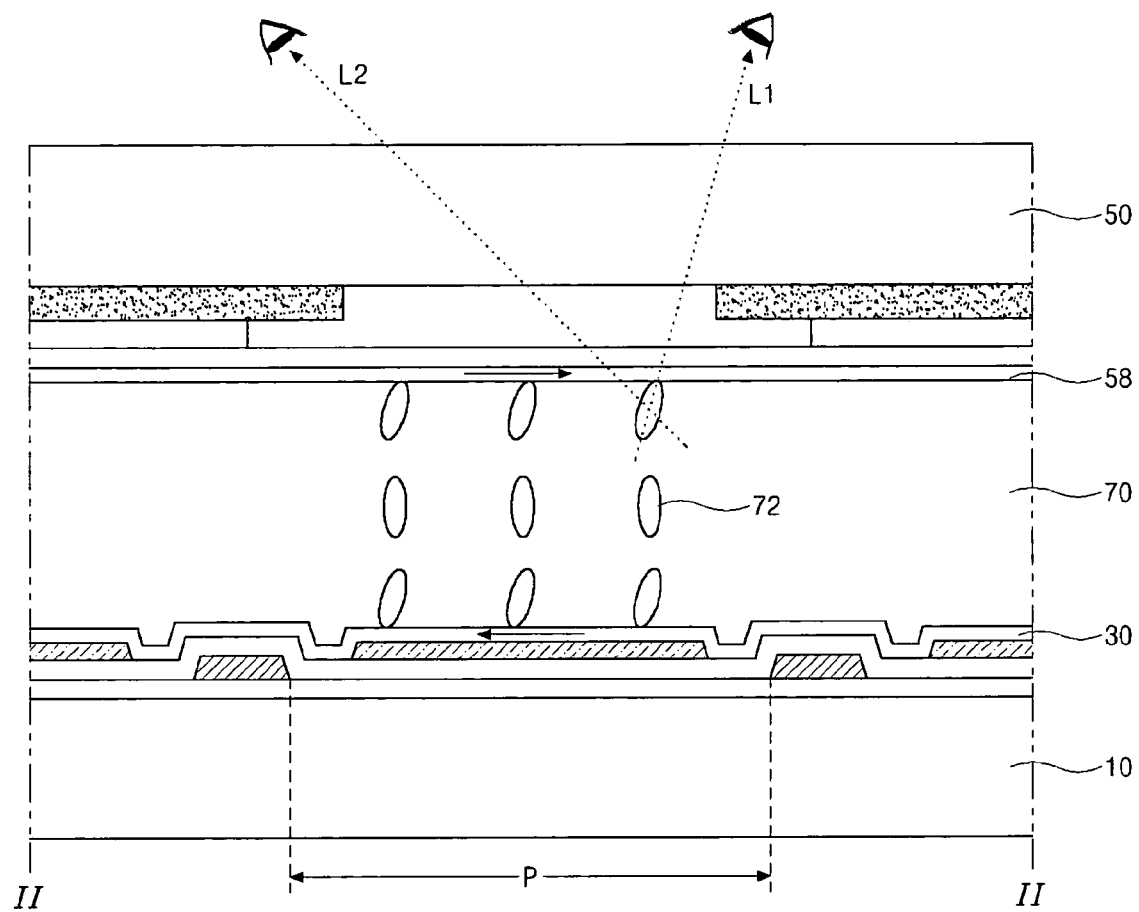
FIG. 2 is a schematic cross-sectional view along II—II of FIGS. 1A and 1B showing the LCD device according to the related art.
Figure 3A:
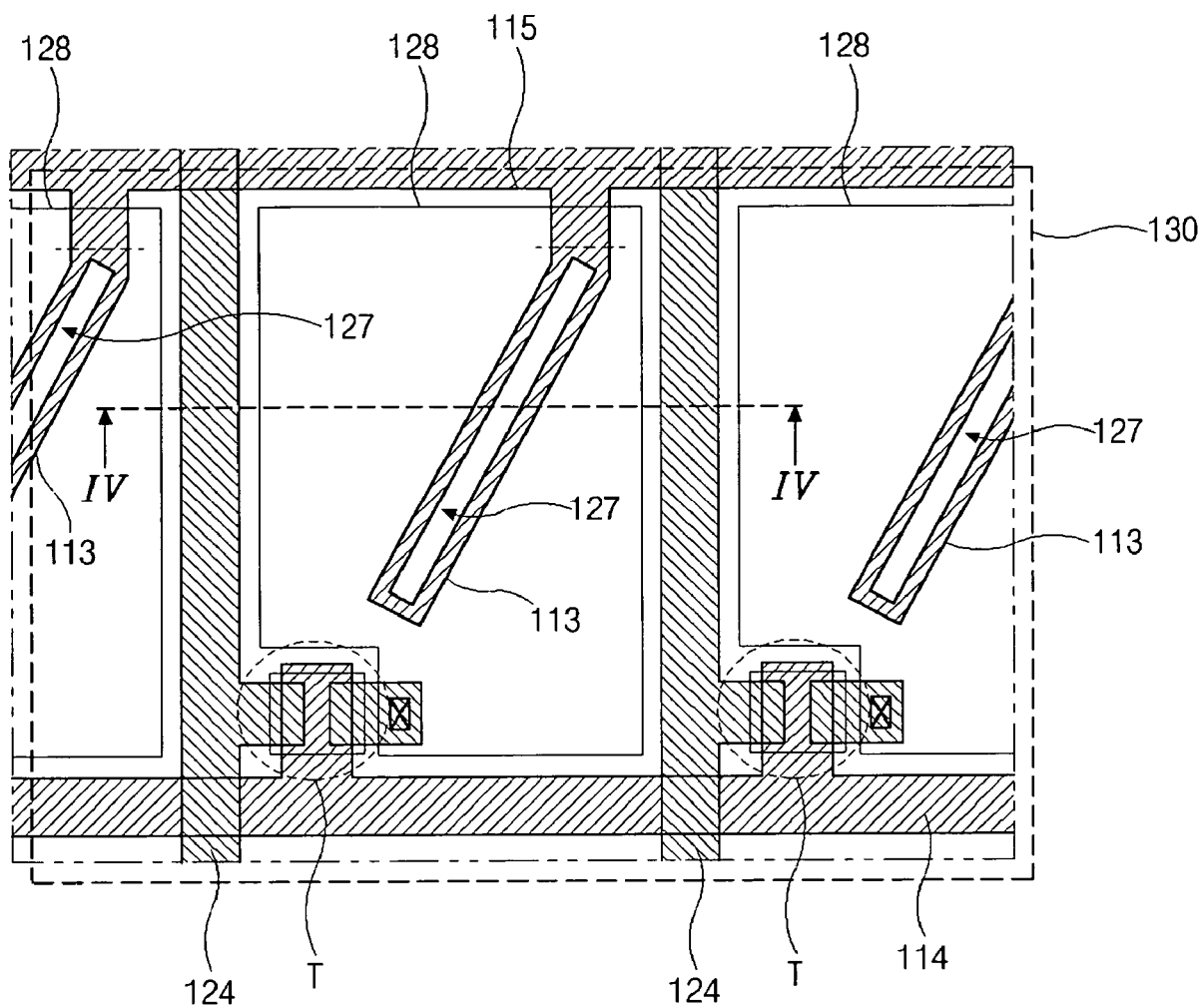
FIG. 3A is a schematic plan view of an array substrate for an LCD device having a 2-domain structure according to the related art.
Figure 3B:
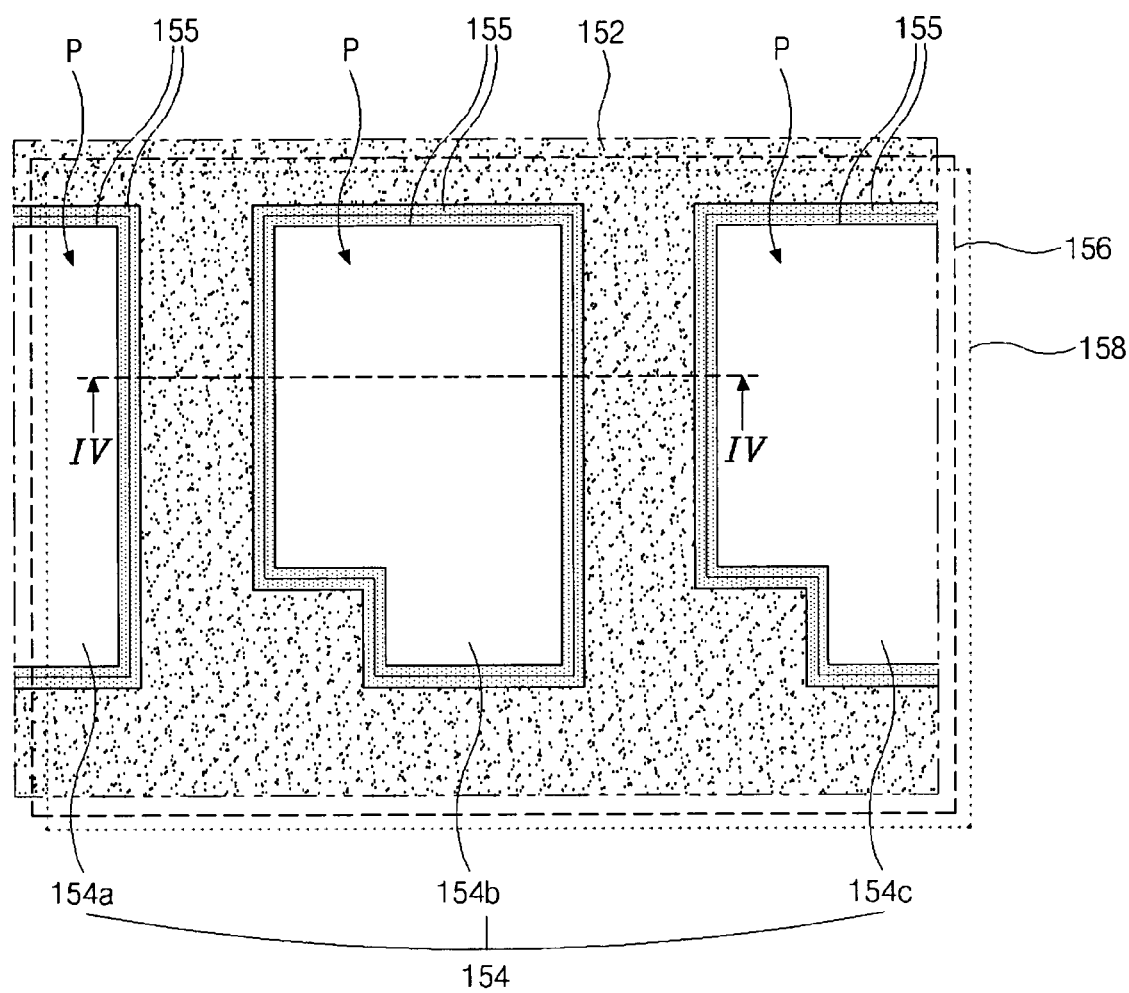
FIG. 3B is a schematic plan view of a color filter substrate for the LCD device of FIG. 3A according to the related art.
Figure 4:
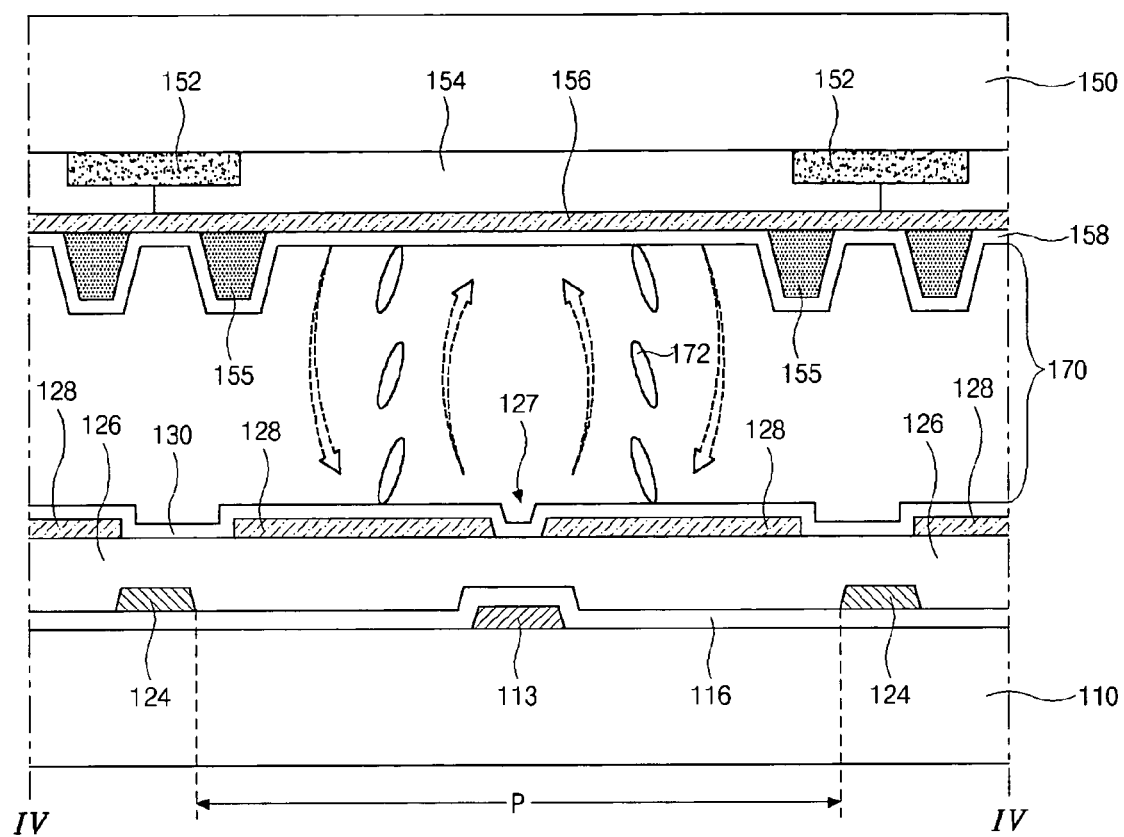
FIG. 4 is a schematic cross-sectional view along IV—IV of FIGS. 3A and 3B showing the LCD having the 2-domain structure according to the related art.
Figure 5A:
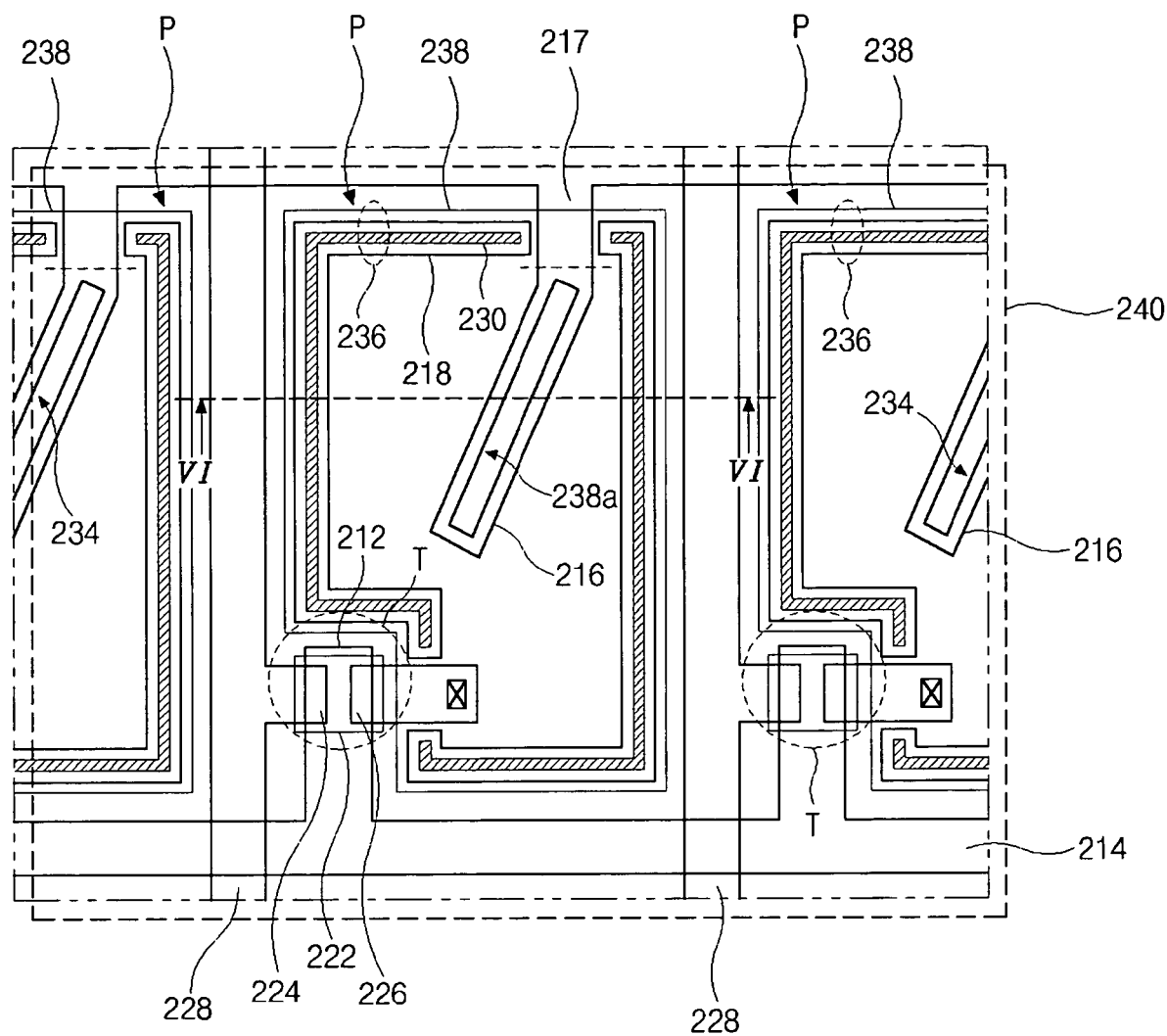
FIG. 5A is a schematic plan view of an exemplary array substrate for an LCD device according to the present invention.
Figure 5B:
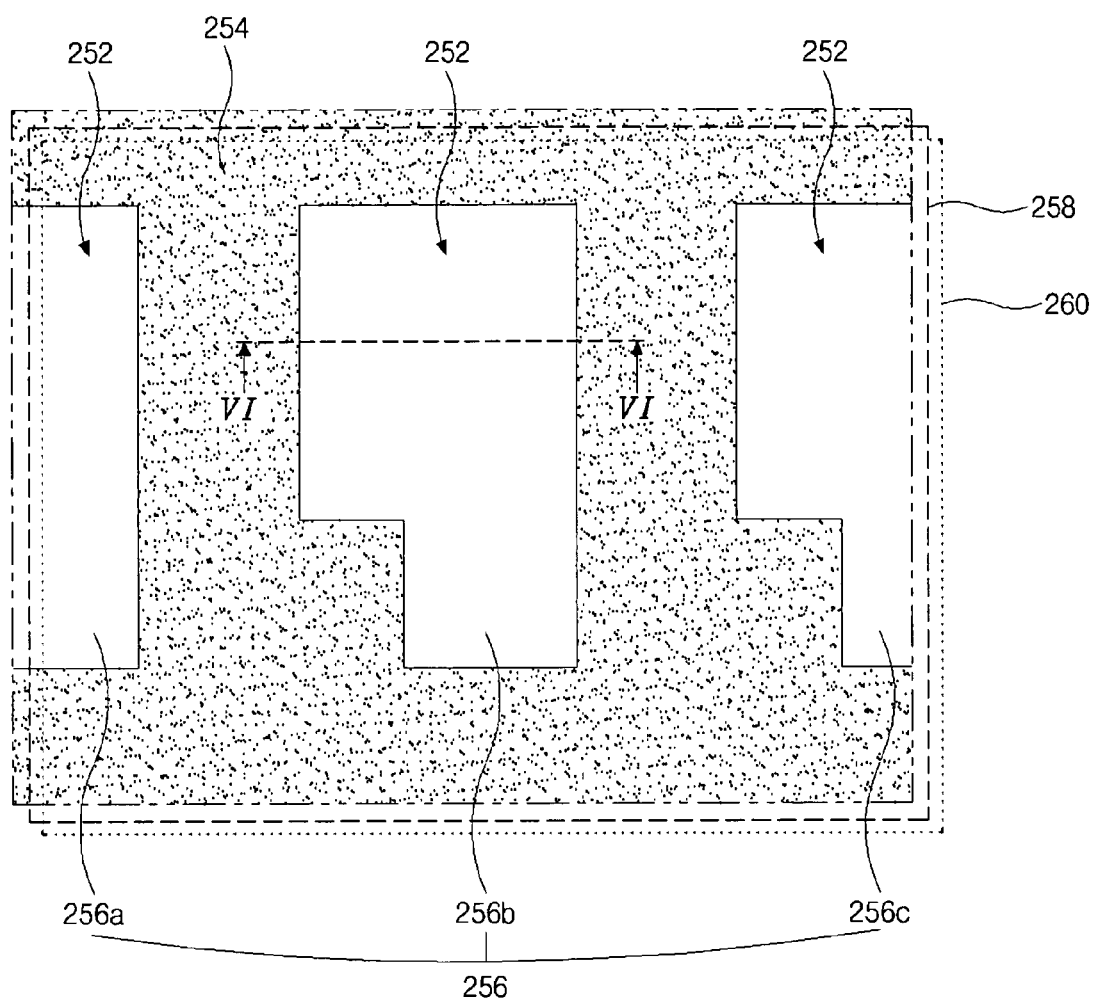
FIG. 5B is a schematic plan view of an exemplary color filter substrate for the LCD device of FIG. 5A according to the present invention.

FIG. 5A is a schematic plan view of an exemplary array substrate for an LCD device according to the present invention, and FIG. 5B is a schematic plan view of an exemplary color filter substrate for the LCD device of FIG. 5A according to the present invention. In FIG. 5A, a gate line 214 may be disposed along a first direction and a data line 228 may be disposed along a second direction perpendicular to the first direction. Accordingly, a pixel region "P" may be defined by the crossing of the gate line 214 and the data line 228, and a TFT "T" may be connected to the gate line 214 and the data line 228. In addition, a pixel electrode 238 may be formed in the pixel region "P" having a slit 238a and a convex portion 236. The slit 238a may be disposed along a diagonal direction of the pixel region "P" and the convex portion 236 may surround the pixel region "P."

In FIG. 5A, an auxiliary electrode 216 corresponding to the slit 238a may be connected to a common line 217, and may be electrically separated from the pixel electrode 238. In addition, first and second buffer patterns 218 and 230 may be sequentially formed in the convex portion 236 without additional processes. For example, the auxiliary electrode 216 and the first buffer pattern 218 may be formed of the same material as the gate line 214 through the same process, and the second buffer pattern 230 may be formed of the same material as the data line 228 through the same process. Furthermore, the first and second buffer patterns 218 and 230 may be formed not to overlap the auxiliary electrode 216 and the drain electrode 226 for preventing electric shortage.

In FIG. 5A, the TFT "T" may include a gate electrode 212 that extends from the gate line 214, a source electrode 224 that extends from the data line 228, a drain electrode 226 that may be spaced apart from the source electrode 224, and a semiconductor layer 222 that may overlap the source and drain electrodes 224 and 226 over the gate electrode 212. In addition, a first orientation film 240 may be formed on the pixel electrode 238.

In FIG. 5B, a black matrix 254 may be formed in a peripheral portion of the pixel region "P" (in FIG. 5A) and may have has an open portion 252 corresponding to the pixel region "P." In addition, a color filter layer 256 may be formed in the pixel region "P," and may include red, green, and blue sub-color filters 256a, 256b, and 256c, wherein the red, green, and blue sub-color filters 256a, 256b, and 256c may be alternately disposed in the pixel region "P." Furthermore, a common electrode 258 and a second orientation film 260 may be sequentially formed on the color filter layer 256, wherein the open portion 252 may be substantially smaller than the pixel region "P."

Figure 6:
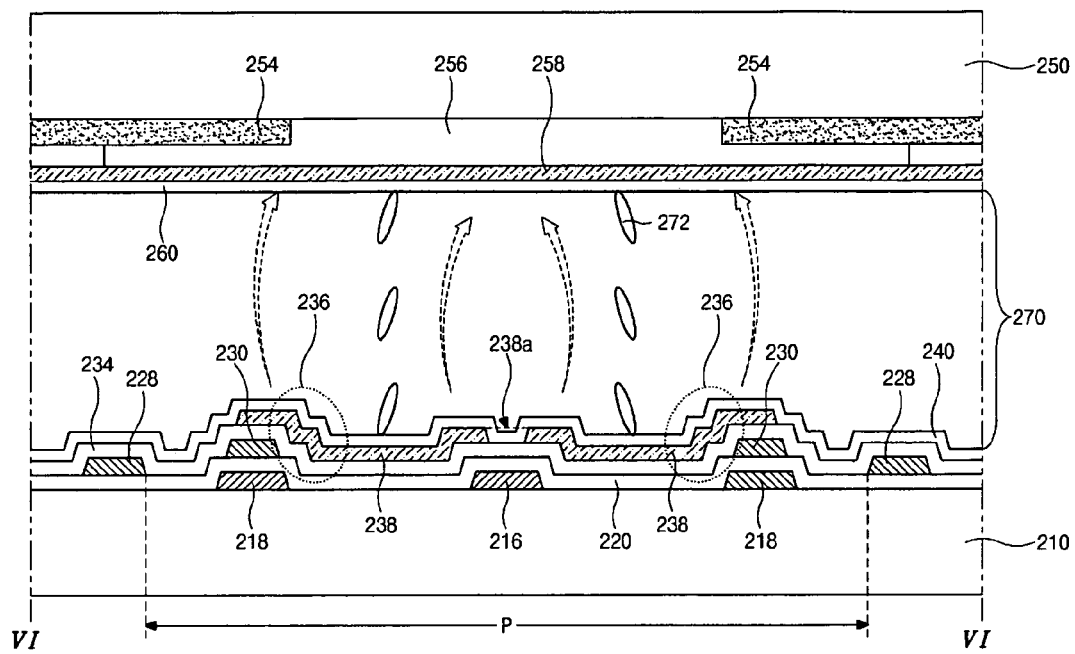
FIG. 6 is a schematic cross-sectional view along VI—VI of FIGS. 5A and 5B showing the LCD device according to the present invention.

FIG. 6 is a schematic cross-sectional view along VI—VI of FIGS. 5A and 5B showing the LCD device according to the present invention. In FIG. 6, first and second substrates 210 and 250 may be spaced apart from and face each other. The auxiliary electrode 216 may be formed on an inner surface of the first substrate 210 in a central portion of the pixel region "P," and the first buffer pattern 218 may be formed in a boundary portion of the pixel region "P" and spaced apart from the auxiliary electrode 216. Then a gate insulating layer 220 may be formed on an entire surface of the first substrate 210, and the second buffer pattern 230 may be formed on the gate insulating layer 220 to correspond to the first buffer pattern 218. Next, the data line 228 may be formed on the gate insulating layer 220 at both sides of the pixel region "P," to be disposed outside the second buffer pattern 230.

Next, a passivation layer 234 may be formed on the second buffer pattern 230 and the data line 228, and a pixel electrode 238 may be formed on the passivation layer 234 in the pixel region "P" to have a slit 238a corresponding to the auxiliary electrode 216. The passivation layer 234 may be formed of one of silicon nitride (SiNx) and silicon oxide (SiO$_2$). The pixel electrode 238 may extend over the second buffer pattern 230, thereby having a convex portion 236 over the first and second buffer patterns 218 and 230. Although not shown in FIG. 6, one of the first and second buffer patterns 218 and 230 may be utilized for the convex portion 236 of the pixel electrode 238. In addition, a third buffer pattern of the same material as a semiconductor layer 222 (in FIG. 5A) may be formed under the pixel electrode 238 for the convex portion 236. Accordingly, the first, second, and third buffer layers may be referred to as a distortion pattern.

A first orientation film 240 may be formed on the pixel electrode 238. The convex portion 236 of the pixel electrode 238 may have a step portion corresponding to a sum of a thickness of the first buffer pattern 218 and a thickness of the second buffer pattern 230. For example, the convex portion 236 of the pixel electrode 238 may have a step portion greater than about 0.7 µm.

In FIG. 6, a black matrix 254 may be formed on an inner surface of the second substrate 250 and corresponds to the data line 228 and the second buffer pattern 230. Thus, a color filter layer 256 may be formed on the black matrix 254. Next, a common electrode 258 and a second orientation film 260 may be sequentially formed on the color filter layer 256.

Then, a liquid crystal layer 270 may be formed between the first and second orientation films 240 and 260. Since an electric field may be distorted by the slit 238a, the convex portion 236, and the auxiliary electrode 216, the liquid crystal layer 270 may be divided into 2 domains each having different alignment states utilizing the slit 238a as a border. In FIG. 6, the dotted arrows designate directions of the distorted electric fields near the slit 238a, the auxiliary electrode 216, and the convex portion 236.

According to the present invention, the convex portion 236 of pixel electrode 238 may be formed at a boundary portion of the pixel region "P" without additional processes instead of forming a protrusive pattern, thereby obtaining a stable 2-domain structure. Moreover, since patterns for distortion of the electric field may be formed on the same substrate, light leakage due to misalignment may be prevented and aperture ratio may be improved.

Figure 7:
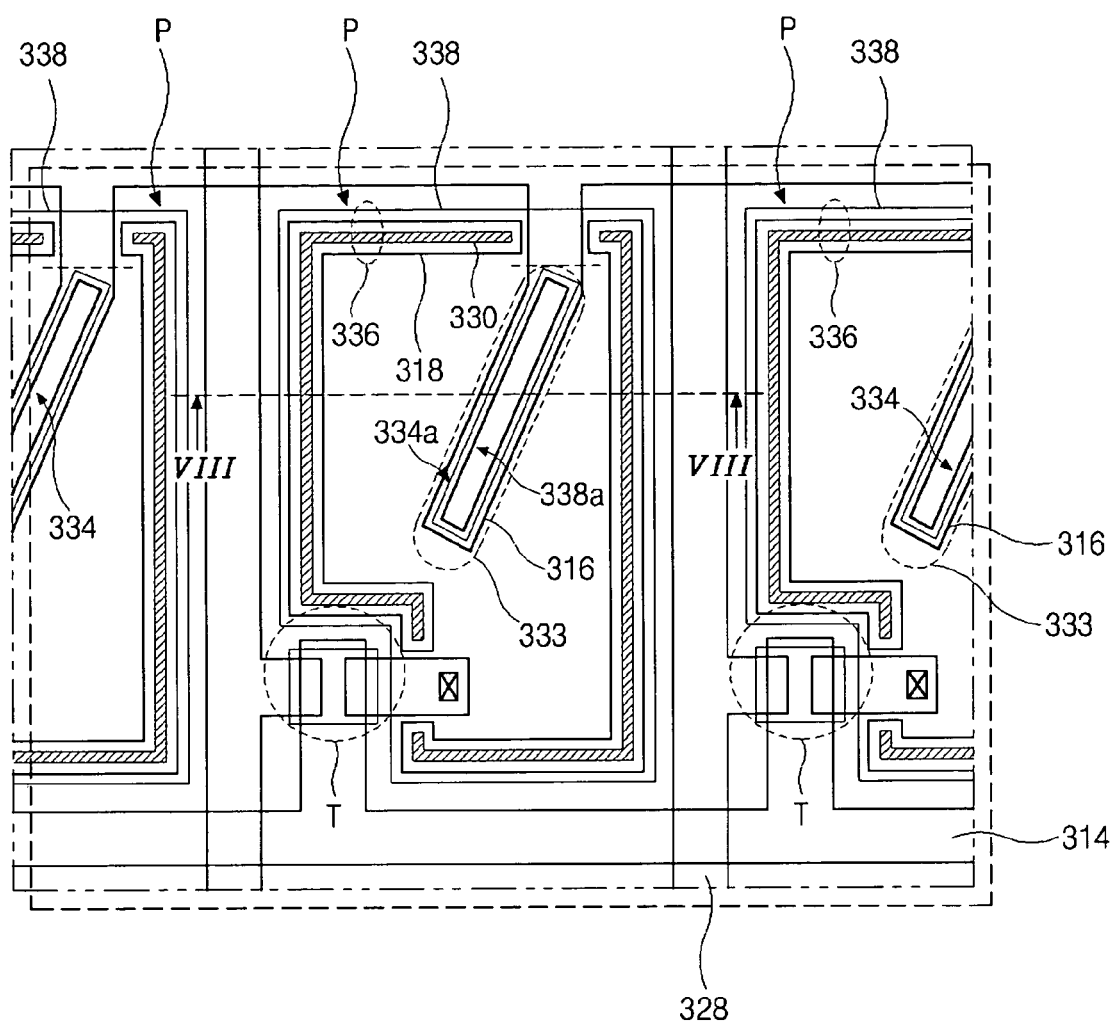
FIG. 7 is a schematic plan view of another exemplary array substrate for an LCD device according to the present invention.

FIG. 7 is a schematic plan view of another exemplary array substrate for an LCD device according to the present invention. In FIG. 7, a gate line 314 may be disposed along a first direction, and a data line 328 may be disposed along a second direction perpendicular to the first direction. Accordingly, a pixel region "P" may be defined by the crossing of the gate line 314 and the data line 328. In addition, a TFT "T" may be connected to the gate line 314 and the data line 328, and may include a gate electrode that extends from the gate line 314, a source electrode that extends from the data line 328, a drain electrode that may be spaced apart from the source electrode, and a semiconductor layer that overlaps the source and drain electrodes over the gate electrode.

In FIG. 7, a pixel electrode 338 may be formed in the pixel region "P" having a slit 338a, a convex portion 336, and a concave portion 333. The slit 338a may be disposed along a diagonal direction of the pixel region "P." In addition, a slit hole 334a and an auxiliary electrode 316 may be disposed to correspond to the slit 338a, and first and second buffer patterns 318 and 330 may be disposed to correspond to a boundary portion of the pixel electrode 338. Accordingly, the concave portion 333 of the pixel electrode 338 may be obtained by the slit hole 334a, and the convex portion 336 surrounding the pixel region "P" may be obtained by the first and second buffer patterns 318 and 330. Although not shown, the slit hole 334a may be formed in a passivation layer for further distortion of an electric field. Accordingly, a step portion of the pixel electrode 338 in the concave portion 333 may depend on a thickness of the passivation layer. For example, the pixel electrode 338 in the concave portion 333 may have a step portion greater than about 0.2 μm.

In fact, the auxiliary electrode 316 may be connected to a common line (not shown), and the auxiliary electrode 316 may be electrically separated from the pixel electrode 338. In addition, the first and second buffer patterns 318 and 330 may be sequentially formed without an additional process. For example, the auxiliary electrode 316 and the first buffer pattern 318 may be formed of the same material as the gate line 314 through the same process, and the second buffer pattern 330 may be formed of the same material as the data line 328 through the same process. Furthermore, the first and second buffer patterns 318 and 330 may be formed not to overlap the auxiliary electrode 316 and the drain electrode 326 for preventing electric short-circuiting. In addition, a first orientation film 340 (in FIG. 8) may be formed on the pixel electrode 338.

Figure 8:
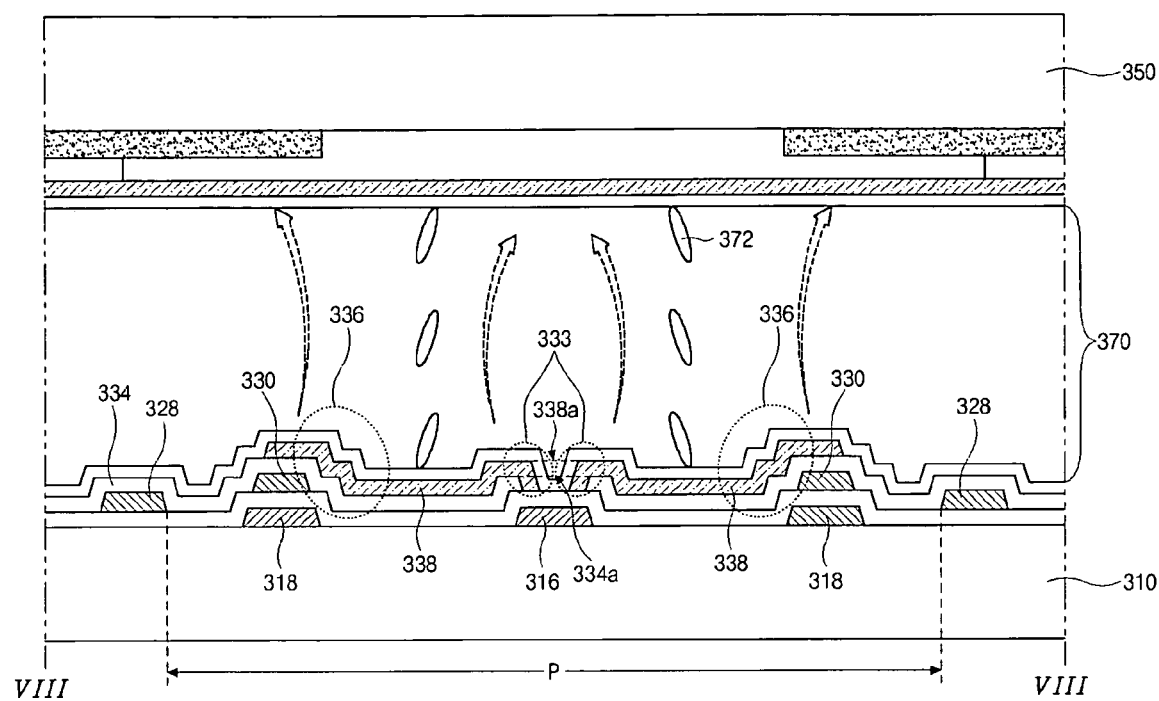
FIG. 8 is a schematic cross-sectional view along VIII—VIII of FIG. 7 showing the LCD device according to the present invention.

FIG. 8 is a schematic cross-sectional view along VIII—VIII of FIG. 7 showing the LCD device according to the present invention. In FIG. 8, first and second substrates 310 and 350 may be spaced apart from and face each other. In addition, an auxiliary electrode 3.16 may be formed on an inner surface of the first substrate 310 in a central portion of the pixel region "P," and a first buffer pattern 318 may be formed in a boundary portion of the pixel region "P" and spaced apart from the auxiliary electrode 316. Then, a gate insulating layer may be formed on an entire surface of the first substrate 310 having the auxiliary electrode 316 and the first buffer pattern 318 and a second buffer pattern 330 may be formed on the gate insulating layer to correspond to the first buffer pattern 318. Next, a data line 328 may be formed on the gate insulating layer at both sides of the pixel region "P," wherein the data line 328 may be disposed outside the second buffer pattern 330.

In FIG. 8, a passivation layer 334 may be formed on the second buffer pattern 330 and the data line 328, and may include a slit hole 334a corresponding to the auxiliary electrode 316. The passivation layer 234 may be formed of one of silicon nitride (SiNx) and silicon oxide (SiO$_2$). Next, a pixel electrode 338 may be formed on the passivation layer 334 in the pixel region "P," and may have a slit 338a corresponding to the slit hole 334a. Accordingly, the pixel electrode 338 may have a concave portion 333 due to the slit hole 334a, and the pixel electrode 338 may extend over the second buffer pattern 330, thereby having a convex portion 336 over the first and second buffer patterns 318 and 330. Next, a first orientation film 340 is formed on the pixel electrode 338.

In FIG. 8, the convex portion 336 of the pixel electrode 338 may have a step portion corresponding to a sum of a thickness of the first buffer pattern 318 and a thickness of the second buffer pattern 330. For example, the pixel electrode 338 in the convex portion 336 may have a step portion greater than about 0.7 μm. Moreover, the concave portion 333 of the pixel electrode 338 may have a step corresponding to a thickness of the passivation layer 334. For example, the pixel electrode 338 in the concave portion 333 may have a step portion greater than about 0.2 μm. Accordingly, the concave portion 333 of the pixel electrode 338 may further distort an electric field to obtain a 2-domain structure having improved stability.

According to the present invention, a black matrix corresponding to the data line 328 and the second buffer pattern 330 may be formed on an inner surface of the second substrate 350, and a color filter layer may be formed on the black matrix. In addition, a common electrode and a second orientation film may be sequentially formed on the color filter layer.

In FIG. 8, a liquid crystal layer 370 may be formed between the first and second orientation films. Since an electric field may be distorted by the slit 338a, the convex portion 336 of the pixel electrode 338, the concave portion 333 of the pixel electrode 338, and the auxiliary electrode 316, the liquid crystal layer 370 may be divided into 2 domains each having different alignment states using the slit 338a as a border. The dotted arrows designate directions of distorted electric fields near the concave portion 333 and the convex portion 336.

According to the present invention, since the convex portion 336 of pixel electrode 338 may be formed at a boundary portion of the pixel region "P," and the concave portion 333 of the pixel electrode 338 may be formed at a central portion of the pixel region "P" instead of forming a protrusive pattern, a more stable 2-domain structure may be obtained having improved stability without additional processes. Moreover, since patterns for distortion of the electric field may be formed on the same substrate, light leakage due to misalignment may be prevented and aperture ratio may be improved.

Figure 9:
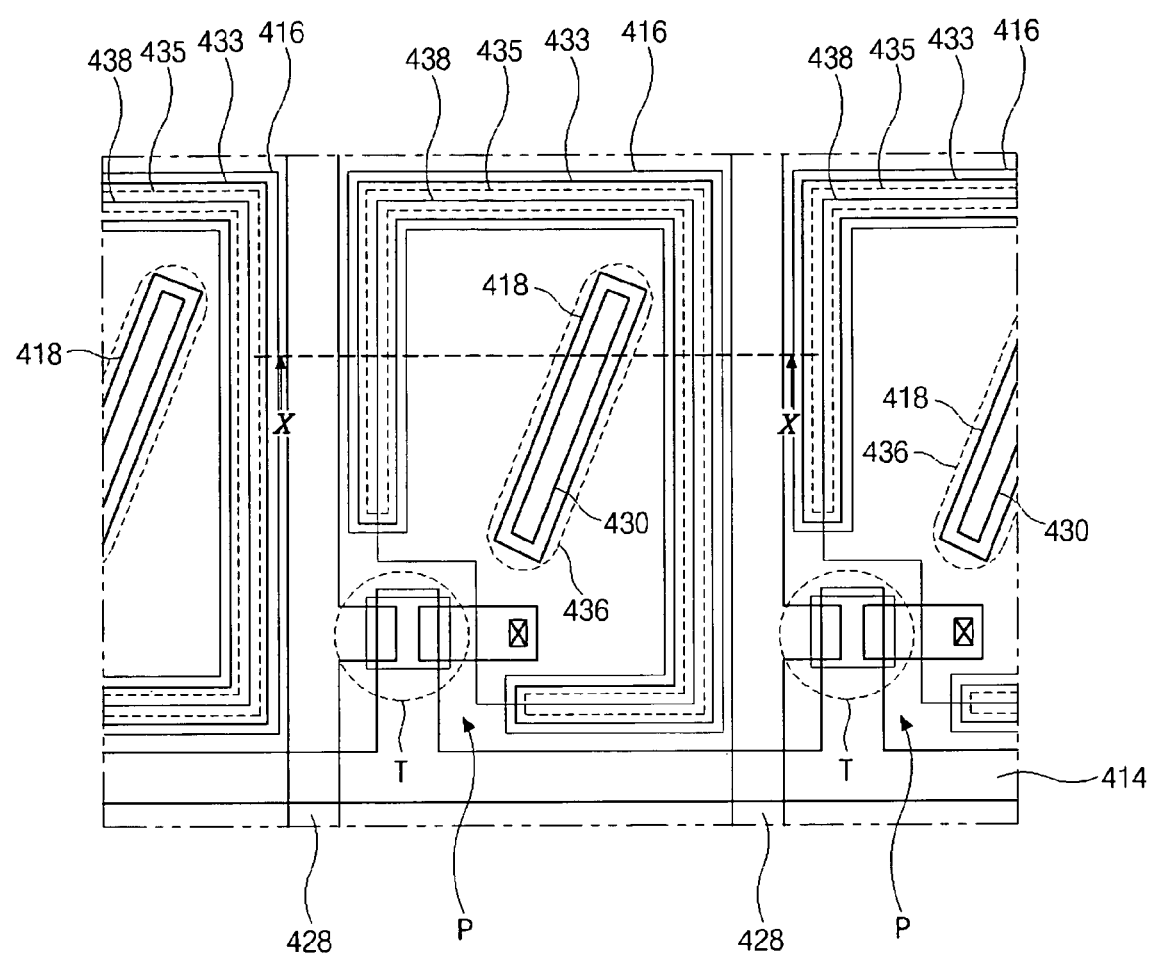
FIG. 9 is a schematic plan view of another exemplary array substrate for an LCD device according to the present invention.

FIG. 9 is a schematic plan view of another exemplary array substrate for an LCD device according to the present invention. In FIG. 9, a gate line 414 may be disposed along a first direction, and a data line 428 may be disposed along a second direction perpendicular to the first direction. Wherein, a pixel region "P" may be defined by the crossing of the gate line 414 and the data line 428. In addition, a TFT "T" may be connected to the gate line 414 and the data line 428, and the TFT "T" may include a gate electrode that extends from the gate line 414, a source electrode that extends from the data line 428, a drain electrode but is spaced apart from the source electrode, and a semiconductor layer that overlaps the source and drain electrodes over the gate electrode.

In FIG. 9, a pixel electrode 438 may be formed in the pixel region "P" and may include a convex portion 436 and a concave portion 435, wherein the convex portion 436 and the concave portion 435 may distort an electric field to obtain a 2-domain structure having improved stability. In addition, the pixel electrode 438 may be connected to the TFT "T," and an auxiliary electrode 416 may be disposed at a boundary portion of the pixel electrode 438, where the auxiliary electrode 416 may be insulated from the pixel electrode 438.

In FIG. 9, first and second buffer patterns 418 and 430 may be subsequently formed in a central portion of the pixel region "P," to obtain the convex portion 436 of the pixel electrode 438. Accordingly, a step portion of the pixel electrode 438 in the convex portion 436 may depend on a sum of a thickness of the first buffer pattern 418 and a thickness of the second buffer pattern 430. In addition, the first and second buffer patterns 418 and 430 may be disposed along a diagonal direction of the pixel region "P" and may be insulated from the pixel electrode 438. Furthermore, a passivation layer 434 (in FIG. 10) may be provided to insulate the pixel electrode 438 from the second buffer pattern 430, and may have a hole 433 corresponding to the auxiliary electrode 416 to obtain the concave portion 435 of the pixel electrode 438. Accordingly, a step portion of the pixel electrode 438 in the concave portion 435 may depend on a thickness of the passivation layer 434 (in FIG. 10).

In FIG. 9, the auxiliary electrode 416 may be connected to a common line (not shown), and the first and second buffer patterns 418 and 430 may be sequentially formed without additional processes. For example, the auxiliary electrode 416 and the first buffer pattern 418 may be formed of the same material as the gate line 414 through the same process, and the second buffer pattern 430 may be formed of the same material as the data line 428 through the same process. In addition, a first orientation film 440 (in FIG. 10) may be formed on the pixel electrode 438.

Figure 10:
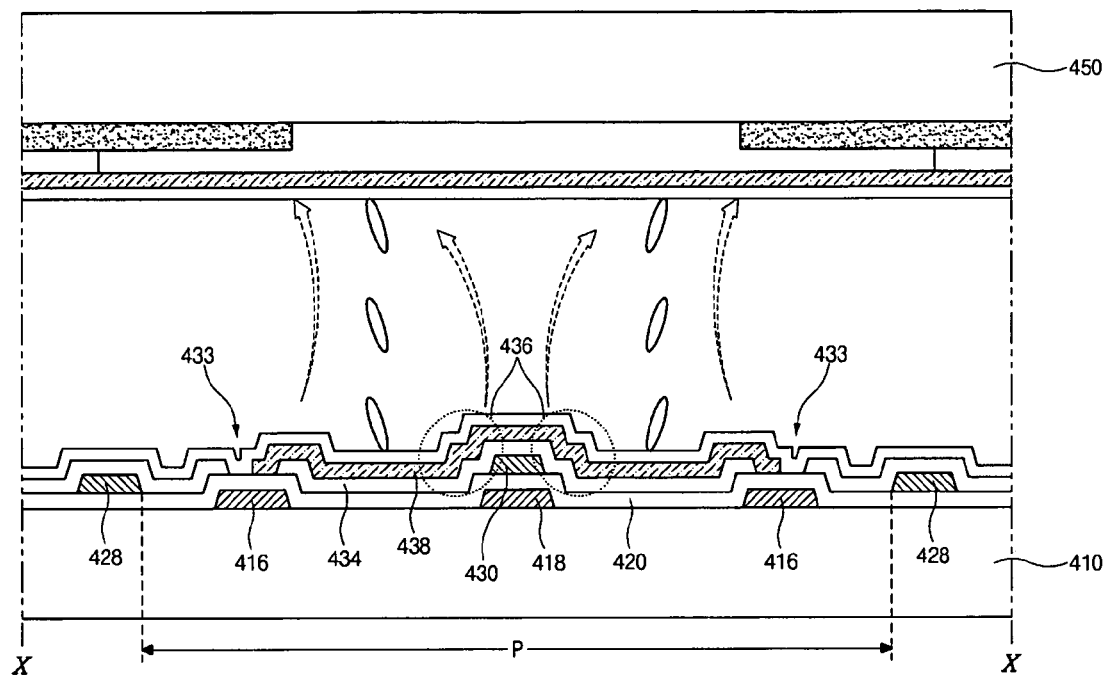
FIG. 10 is a schematic cross-sectional view X—X of FIG. 9 showing the LCD device according to the present invention.

FIG. 10 is a schematic cross-sectional view X—X of FIG. 9 showing the LCD device according to the present invention. In FIG. 10, first and second substrates 410 and 450 may be spaced apart from and face each other. The first buffer pattern 418 may be formed on an inner surface of the first substrate 410 in a central portion of the pixel region "P," and the auxiliary electrode 416 spaced apart from the first buffer pattern 418 may be formed on the inner surface of the first substrate 410 in a boundary portion of the pixel region "P." Then, a gate insulating layer 420 may be formed on an entire surface of the first substrate 410 having the first buffer pattern 418 and the auxiliary electrode 416. Next, a second buffer pattern 430 corresponding to the first buffer pattern 418 may be formed on the gate insulating layer 420. Then, the data line 428 may be formed on the gate insulating layer 420 at both sides of the pixel region "P," and may be disposed outside the auxiliary electrode 416. For example, the first buffer pattern 418 and the auxiliary electrode 416 may be formed of the same material as the gate line through the same process, and the second buffer pattern 430 may be formed of the same material as the data line 428 through the same process.

In FIG. 10, a passivation layer 434 may be formed on the second buffer pattern 430 and the data line 428, and the may have the hole 433 corresponding to the auxiliary electrode 416. The passivation layer 434 may be formed of one of silicon nitride (SiNx) and the silicon oxide ($SiO_2$). Then, the pixel electrode 438 may be formed on the passivation layer 434 in the pixel region "P," and may extend to the hole 433, thereby overlapping the auxiliary electrode 416. Accordingly, the pixel electrode 438 may have the concave portion 435 corresponding to the hole 433, and may cover the second buffer pattern 430. Similarly, the pixel electrode 438 may have the convex portion 436 corresponding to the first and second buffer patterns 418 and 430. In addition, the first orientation film 440 may be formed on the pixel electrode 338.

In FIG. 10, the auxiliary electrode 416 is disposed at the boundary portion of the pixel electrode 438, and the first and second buffer patterns 418 and 430 may be disposed at the central portion of the pixel electrode 438. Accordingly, the pixel electrode 438 may have the convex portion 436 at the central portion of the pixel region "P," and may have the concave portion 435 at a boundary portion of the pixel region "P." The convex portion 436 of the pixel electrode 438 may have a step portion corresponding to a sum of a thickness of the first buffer pattern 418 and a thickness of the second buffer pattern 430. For example, the pixel electrode 438 in the convex portion 436 may have a step portion greater than about 0.7 µm. Moreover, the concave portion 435 of the pixel electrode 438 may have a step portion corresponding to a thickness of the passivation layer 434. For example, the pixel electrode 438 in the concave portion 435 may have a step portion greater than about 0.2 µm. Accordingly, the concave portion 435 of the pixel electrode 438 may further distort an electric field to obtain a 2-domain structure, having improved stability.

According to the present invention, a black matrix corresponding to the data line 428 and the auxiliary electrode 416 may be formed on an inner surface of the second substrate 450, and a color filter layer may be formed on the black matrix. In addition, a common electrode and a second orientation film may be sequentially formed on the color filter layer.

In FIG. 10, a liquid crystal layer 440 may be formed between the first orientation film 440 and a second orientation film (not shown) formed on an inner surface of the second substrate 450. Since an electric field may be distorted due to the convex portion 436 and the concave portion 435, the liquid crystal layer 470 may be divided into 2 domains each having different alignment states using the convex portion 436 as a border thereby obtaining a stable 2-domain structure. The dotted arrows designate directions of the distorted electric fields near the concave portion 435 and the convex portion 436.

According to the present invention, since the convex portion 436 of pixel electrode 438 may be formed at a central portion of the pixel region "P," and the concave portion 435 of the pixel electrode 438 may be formed at a boundary portion of the pixel region "P" instead of forming a protrusive pattern on the second substrate 450, a stable 2-domain structure may be obtained without additional processes. Moreover, since patterns for distorting the electric field may be formed on the same substrate, light leakage due to misalignment may be prevented and aperture ratio may be improved. Although the pixel electrode 438 may have the convex portion 436 and the concave portion 435, the pixel electrode 438 may be formed to have one of the convex portion 436 and the concave portion 435.

Although the exemplary LCD devices of FIGS. 5A–10 of the present invention may be fabricated through a 5-mask process, an LCD device having a 2-domain structure may be fabricated through a 4-mask process. Wherein the mask process may include photolithographic processes using a photoresist (PR).

Figure 11:
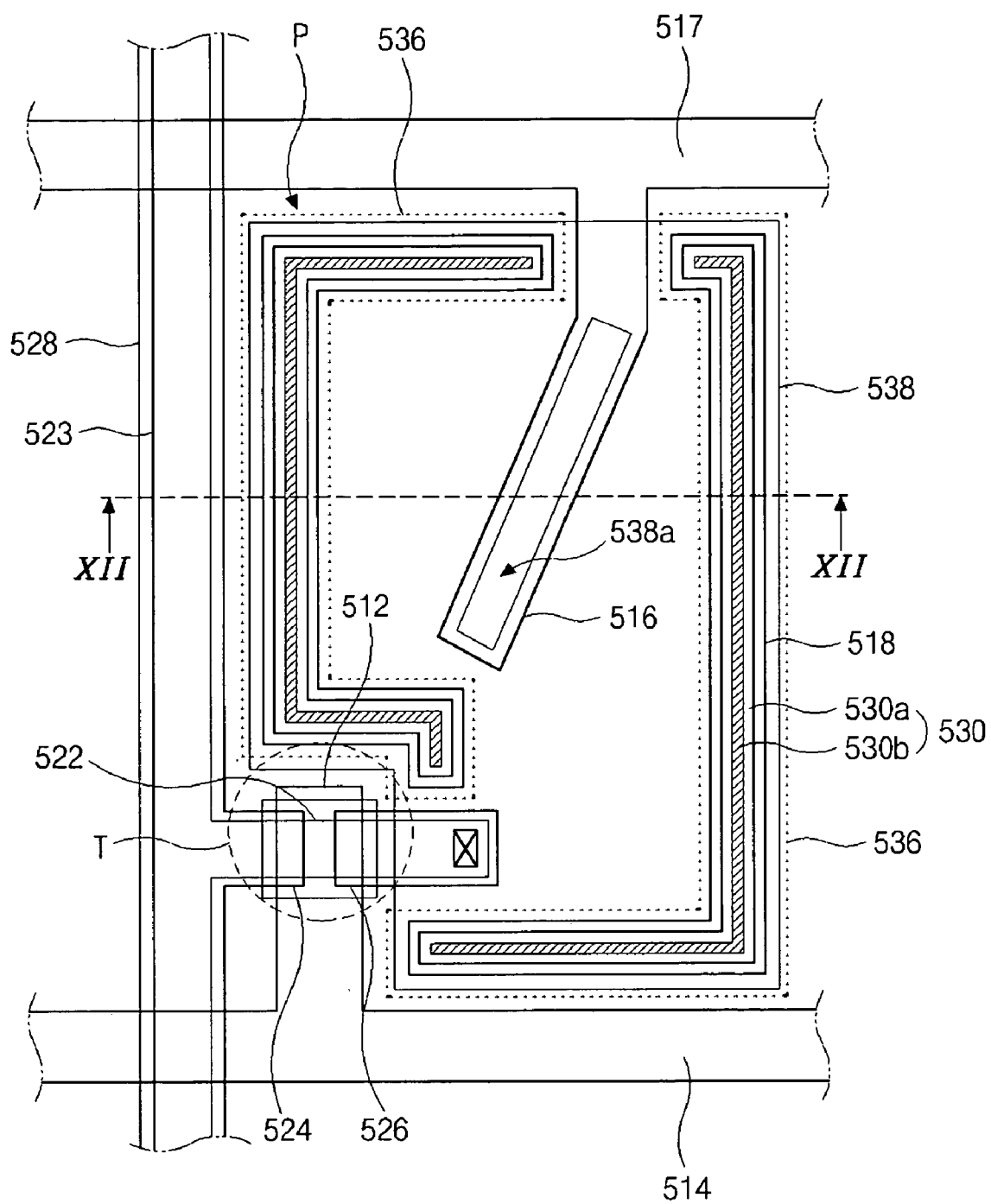
FIG. 11 is a schematic plan view of another exemplary array substrate for an LCD device according to the present invention.

FIG. 11 is a schematic plan view of another exemplary array substrate for an LCD device according to the present invention. In FIG. 11, a gate line 514 may be disposed along a first direction, and a data line 528 may be disposed along a second direction perpendicular to the first direction, wherein a pixel region "P" may be defined by the crossing of the gate line 514 and the data line 528. In addition, a TFT "T" may be connected to the gate line 514 and the data line 528, and may include a gate electrode 512 that extends from the gate line 514, a source electrode 524 that extends from the data line 528, a drain electrode 526 that is spaced apart from the source electrode 524, and a semiconductor layer 522 that overlaps the source and drain electrodes 524 and 526 over the gate electrode 512. Accordingly, the semiconductor layer 522 may be connected to a semiconductor pattern 523 corresponding to the data line 528, the source electrode 524, and the drain electrode 526.

In FIG. 11, a pixel electrode 538 may be formed in the pixel region "P" and may include a slit 538a connected to the TFT "T." Then, first and second buffer patterns 518 and 530 may be sequentially formed at a boundary portion of the pixel electrode 538 to be insulated from the pixel electrode 538. Accordingly, the pixel electrode 538 may have a convex portion 536 at a boundary portion of the pixel region "P" due to the first and second buffer patterns 518 and 530. The first and second buffer patterns 518 and 530 may be formed without adding a fabrication step. For example, the first buffer pattern 518 may be formed of the same material as the gate line 514 through the same process, and the second buffer pattern 530 may include a first layer 530a and a second layer 530b. The first layer 530a of the second buffer pattern 530 may be formed of the same material as the semiconductor layer 522 through the same process, and the second layer 530b of the second buffer pattern 530 may be formed of the same material as the data line 528 through the same process.

The slit 538a may be disposed along a diagonal direction of the pixel electrode 538 and an auxiliary electrode 516 corresponding to the slit 538a may be connected to a common line 517. The auxiliary electrode 516 and the common line 517 may be electrically separated from the pixel electrode 538 and may be formed of the same material as the gate line 514 through the same process. In addition, a first orientation film 540 may be formed on the pixel electrode 538, and the first and second buffer patterns 518 and 530 may be formed not to overlap the auxiliary electrode 516 and the drain electrode 526 for preventing electric short-circuiting.

Figure 12:
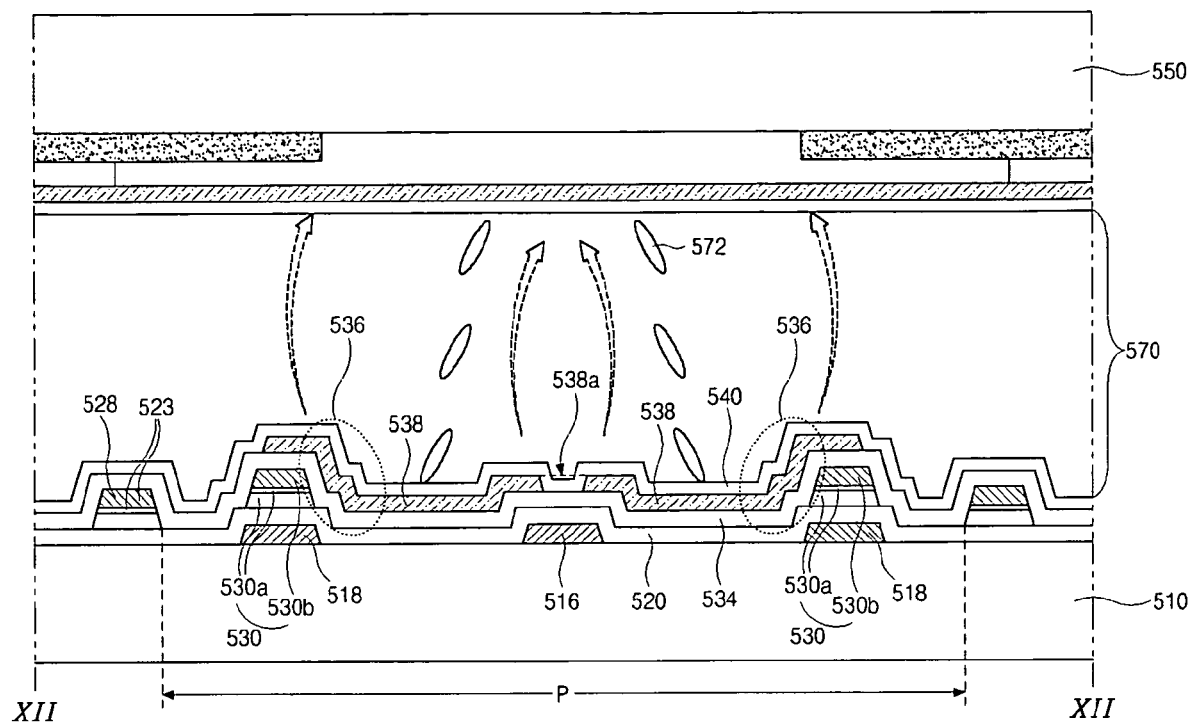
FIG. 12 is a schematic cross-sectional view along XII—XII of FIG. 11 showing the LCD device according to the present invention.

FIG. 12 is a schematic cross-sectional view along XII—XII of FIG. 11 showing the LCD device according to the present invention. In FIG. 12, first and second substrates 510 and 550 may be spaced apart from and face each other. The auxiliary electrode 516 may be formed on an inner surface of the first substrate 510 in a central portion of the pixel region "P," and the first buffer pattern 518 may be formed in a boundary portion of the pixel region "P" and spaced apart from the auxiliary electrode 516. Then, a gate insulating layer 520 may be formed on an entire surface of the first substrate 510 having the auxiliary electrode 516 and the first buffer pattern 518, wherein the second buffer pattern 530 may be formed on the gate insulating layer 520 to correspond to the first buffer pattern 518, and the data line 528 may be formed on the gate insulating layer 520 at both sides of the pixel region "P," and may be disposed outside the second buffer pattern 530. The second buffer pattern 530 includes a first layer 530a of a semiconductor material and a second layer 530b of a metallic material. Then, a semiconductor pattern 523 may be formed under the data line 528.

In FIG. 12, a passivation layer 534 may be formed on the second buffer pattern 530 and the data line 528. The pixel electrode 538 may be formed on the passivation layer 534 in the pixel region "P" and may include a slit 538a corresponding to the auxiliary electrode 516. The pixel electrode 538 may extend over the second buffer pattern 530, wherein the convex portion 536 may be provided over the first and second buffer patterns 518 and 530. In addition, a first orientation film 540 may be formed on the pixel electrode 538, and may be formed of one of silicon nitride (SiNx) and silicon oxide (SiO$_2$). The convex portion 536 of the pixel electrode 538 may have a step portion corresponding to a sum of a thickness of the first buffer pattern 518 and a thickness of the second buffer pattern 530. Since the second buffer pattern 530 may include the first and second layers 530a and 530b, the thickness of the second buffer pattern 530 may be greater than that of the second buffer pattern 230 (in FIG. 6). Thus, the electric field may be further distorted and viewing angle may be further improved.

According to the present invention, a black matrix corresponding to the data line 528 and the second buffer pattern 530 may be formed on an inner surface of the second substrate 550. In addition, a color filter layer may be formed on the black matrix, and a common electrode and a second orientation film may be sequentially formed on the color filter layer.

In FIG. 11, a liquid crystal layer 570 may be formed between the first orientation film 540 and the second orientation film. Since an electric field may be distorted by the auxiliary electrode 516, the slit 538a, and the convex portion 536 of the pixel electrode 538, the liquid crystal layer 570 may be divided into 2 domains each having different alignment states utilizing the slit 538a as a border. The dotted arrows designate directions of the distorted electric fields near the slit 538a, the auxiliary electrode 516, and the convex portion 536.

According to the present invention, the convex portion 536 of pixel electrode 538 may be formed at a boundary portion of the pixel region "P" without additional processes instead of forming a protrusive pattern on the second substrate 550, thereby obtaining a stable 2-domain structure. Moreover, since patterns for distortion of the electric field may be formed on the same substrate, light leakage due to misalignment may be prevented and aperture ratio may be improved.

Figure 13A:
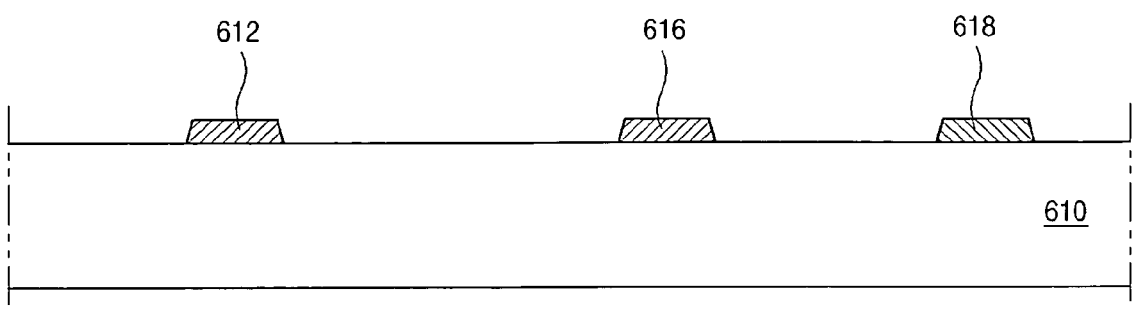
FIGS. 13A to 13D are schematic cross-sectional views of an exemplary fabricating process of an array substrate for an LCD device according to the present invention.

FIGS. 13A to 13D are schematic cross-sectional views of an exemplary fabricating process of an array substrate for an LCD device according to the present invention. In FIG. 13A, a first metallic material having a low resistivity may be deposited onto a substrate 610. Then, a gate electrode 612, an auxiliary electrode 616, and a first buffer pattern 618 may be formed through a first mask process including exposure, development, and patterning steps. For example, a metal including aluminum may be utilized as the first metallic material.

Figure 13B:
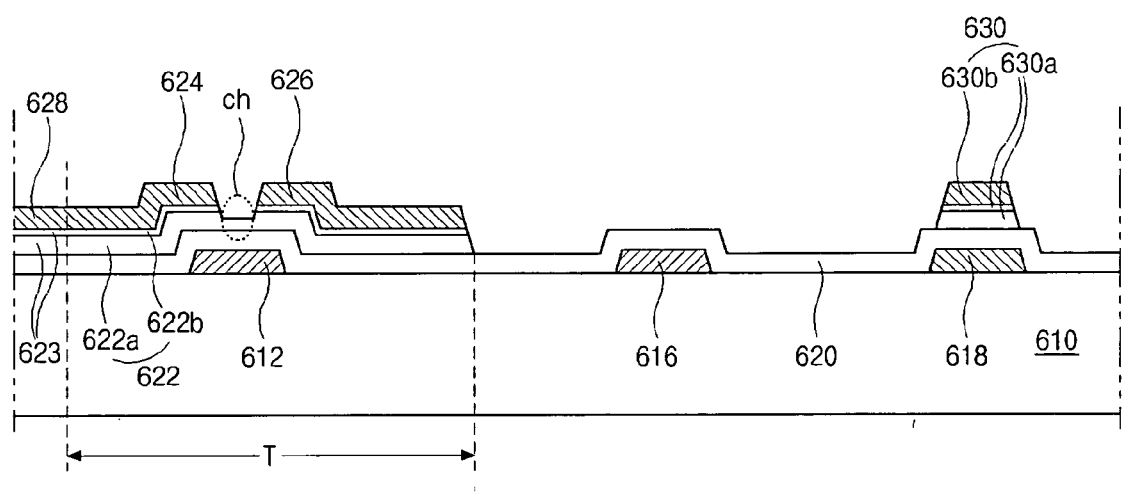
Figure 13C:
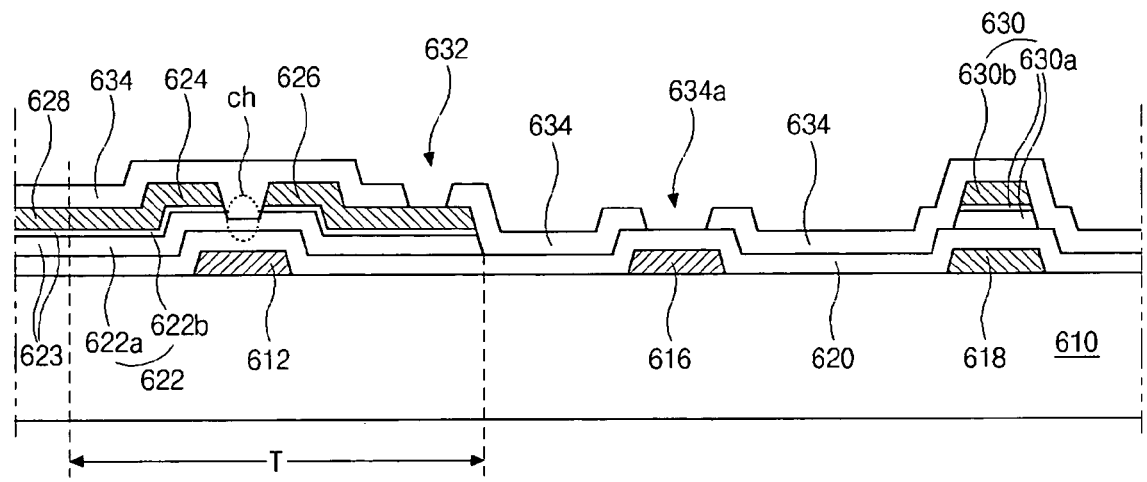

In FIG. 13B, a first insulating material layer, an amorphous silicon layer, an impurity-doped silicon layer, and a second metallic material layer may be sequentially deposited on the first substrate 610, and then patterned using a second mask process. Accordingly, a gate insulating layer 620 may be formed above the gate electrode 612, an active layer 622a and ohmic contact layers 622b may be formed on the gate insulating layer 620, a source electrode 624 and a drain electrode 626 may be formed on the ohmic contact layers 622b, and a second buffer pattern 630 may be formed to overlap the first buffer pattern 618. The second buffer pattern 630 may include portions of the amorphous silicon layer and the impurity-doped silicon layer 623 and the second metallic material layer corresponding to a first layer 630a and a second layer 630b, respectively. The first insulating material layer may include one of silicon nitride (SiNx) and silicon oxide (SiO$_2$), and the second metallic material layer may be selected from a group including molybdenum (Mo), nickel (Ni), chromium (Cr), tungsten (W) and titanium (Ti). Accordingly, the data line 628 may be connected to the source electrode 624.

In FIG. 13B, the ohmic contact layer 622b exposed between the source and drain electrodes 624 and 626 may be removed using a diffraction mask or a half-tone mask (not shown) thereby exposing a portion of the active layer 622a between the source and drain electrodes 624 and 626. The exposed portion of the active layer 622a may be referred to as a channel "ch," and the gate electrode 612, the semiconductor layer 622, the source electrode 624, and the drain electrode 626 may constitute a TFT In FIG. 13C, a second insulating material layer may be deposited on the TFT "T," and then a passivation layer 634 having a drain contact hole 632 and a slit hole 634a may be formed through a third mask process. Accordingly, the drain electrode 626 may be exposed through the drain contact hole 632, and the slit hole 634a may correspond to the auxiliary electrode 616. An inorganic insulating material, such as silicon nitride (SiNx) and silicon oxide (SiO$_2$), may be utilized as the second insulating material layer.

Figure 13D:
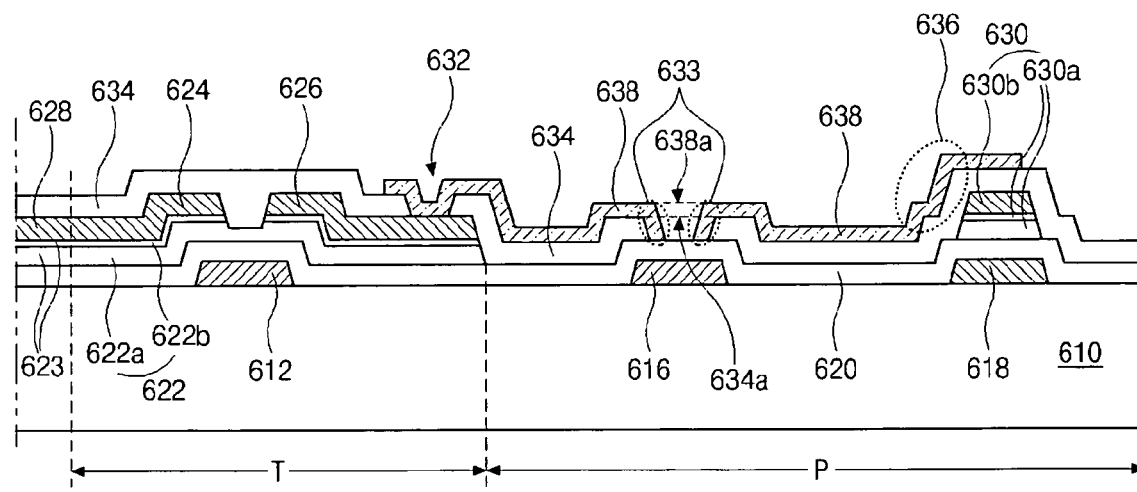

In FIG. 13D, after depositing a transparent conductive material on the passivation layer 634, a pixel electrode 638 connected to the drain electrode 626 through the drain contact hole 632 may be formed through a fourth mask process. The pixel electrode 638 may have a slit 638a corresponding to the slit hole 634a, and may overlap the second buffer pattern 630. Accordingly, the pixel electrode 638 may have a convex portion 636 in a boundary portion of the pixel region "P" due to the first and second buffer patterns 618 and 630 and a concave portion 633 in a central portion of the pixel region "P" due to the slit hole 634a. During the operation of the LCD device, the convex portion 636, the concave portion 633, the slit 634, and the auxiliary electrode 616 may distort an electric field to obtain a stable 2-domain structure, thereby improving the viewing angle of the LCD device.

Although not shown, a gate line may cross the data line 628 to define the pixel region "P," and the pixel electrode 638 may be formed in the pixel region "P," and the transparent conductive material may be selected from indium-tin-oxide (ITO) and indium-zinc-oxide (IZO).

According to the present invention, since the convex portion 636 may be produced at a boundary portion of the pixel region "P" and the concave portion 633, the slit 638a, and the auxiliary electrode 616 may be provided at a central portion of the pixel region "P" without additional processes, a stable 2-domain structure may be obtained and viewing angle may be improved. Moreover, since the array substrate may be fabricated through 4-mask process, a total number of fabrication processes may be reduced and production yield may be improved. Furthermore, since patterns for distortion of an electric field may be formed on the same substrate, light leakage due to misalignment may be prevented and aperture ratio may be improved.

Figure 14:
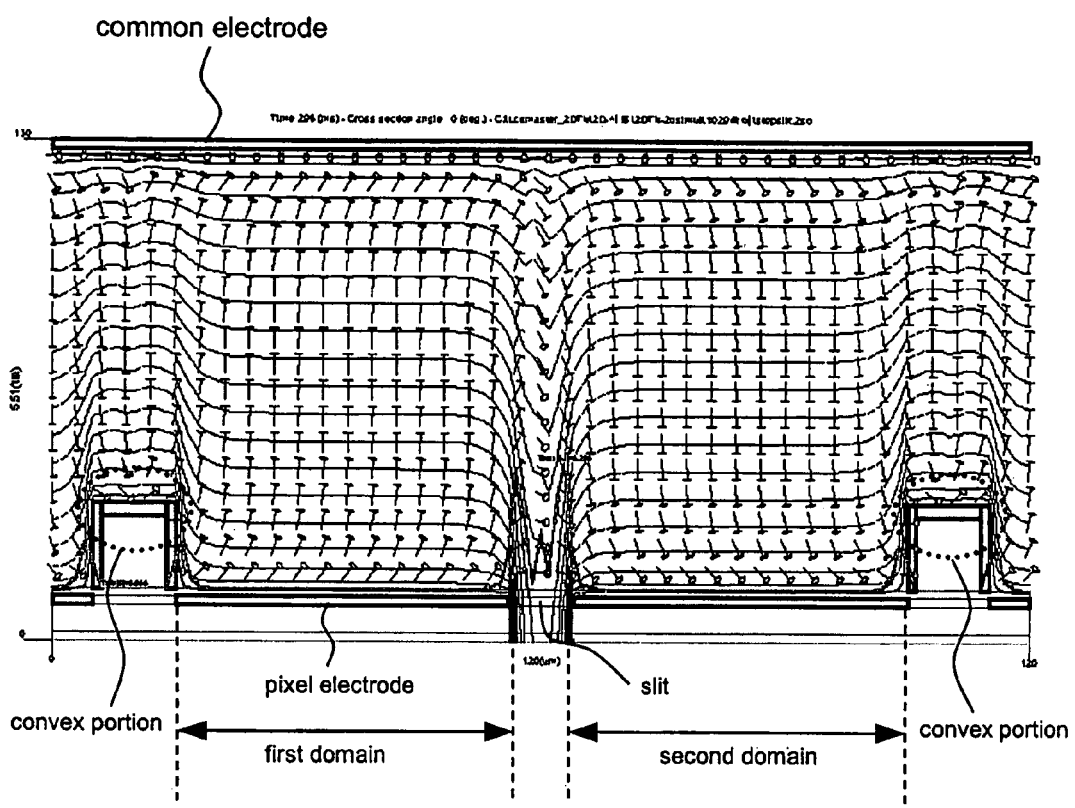
FIG. 14 is a view showing a distorted electric field of the LCD device according to the first embodiment of the present invention.

FIG. 14 is a view showing a distorted electric field of the LCD device according to the first embodiment of the present invention. In FIG. 14, a TN mode 2-domain structure due to a convex portion and a slit of a pixel electrode on a first substrate may be obtained without forming additional protrusive portions on a second substrate. Although the LCD device may have the 2-domain structure, as described above, a multi-domain structure may be used.

Consequently, in an LCD device of the present invention, a multi-domain structure formed by a convex portion and a concave portion may be obtained without an additional processes. Accordingly, light leakage due to misalignment, may be prevented and aperture ratio may be improved by minimizing attachment margin. Moreover, the individual fabrication processes may be reduced and production yield may be improved.

It will be apparent to those skilled in the art that various modifications and variations can be made in the LCD device and method of fabricating an LCD device of the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display (LCD) device, comprising:
    a gate line and a data line on a substrate, the gate line crossing the data line to define a pixel region;
    a thin film transistor connected to the gate line and the data line;
    a pixel electrode connected to the thin film transistor, wherein the pixel electrode has a slit at a central portion;
    a distortion pattern under the pixel electrode;
    an auxiliary electrode corresponding to the slit of the pixel electrode, wherein the auxiliary electrode is formed under the pixel electrode; and
    a passivation layer between the pixel electrode and the auxiliary electrode, wherein the passivation layer has a slit hole corresponding to the slit of the pixel electrode.

2. The array substrate according to claim 1, wherein the pixel electrode has a convex portion corresponding to the distortion pattern.

3. The array substrate according to claim 1, wherein the pixel electrode has a boundary portion surrounding the central portion, and the distortion pattern is disposed at the boundary portion.

4. The array substrate according to claim 1, wherein the slit has a rectangular shape disposed along a diagonal direction of the pixel region.

5. The array substrate according to claim 1, wherein the pixel electrode has a concave portion corresponding to the slit hole.

6. The array substrate according to claim 1, wherein the pixel electrode has a boundary portion surrounding the central portion and the distortion pattern is disposed at the central portion.

7. The array substrate according to claim 6, further comprising an auxiliary electrode at the boundary portion, wherein the auxiliary electrode is formed under the pixel electrode.

8. The array substrate according to claim 7, wherein the passivation layer has a hole corresponding to the auxiliary electrode.

9. The array substrate according to claim 8, wherein the pixel electrode has a concave portion corresponding to the hole.

10. The array substrate according to claim 1, wherein the distortion pattern includes a first buffer pattern and a second buffer pattern over the first buffer pattern.

11. The array substrate according to claim 10, wherein the first buffer pattern includes the same material as the gate line, and the second buffer layer includes the same material as the data line.

12. The array substrate according to claim 10, wherein the thin film transistor includes a gate electrode, a semiconductor layer, a source electrode, and a drain electrode.

13. The array substrate according to claim 12, wherein the second buffer pattern includes a first layer of the same material as the semiconductor layer, and a second layer of the same material as the source and drain electrodes.

14. The substrate according to claim 1, wherein the distortion pattern includes a first buffer pattern, a second buffer pattern, and a third buffer pattern.

15. The substrate according to claim 14, wherein the first buffer pattern includes the same material as the gate line, the second buffer pattern includes the same material as the data line, and the third buffer pattern includes a semiconductor material.

16. An LCD device, comprising:
first and second substrates spaced apart and facing from each other;
a gate line and a data line on the first substrate, the gate line crossing the data line to define a pixel region;
a thin film transistor connected to the gate line and the data line;
a pixel electrode connected to the thin film transistor, wherein the pixel electrode has a central portion and a boundary portion surrounding the central portion, and wherein the pixel electrode has a slit at the central portion;
a distortion pattern under the pixel electrode, wherein the distortion portion is disposed under the boundary portion;
an auxiliary electrode corresponding to the slit, wherein the auxiliary electrode is formed under the pixel electrode;
a passivation layer between the pixel electrode and the auxiliary electrode, wherein the passivation layer has a slit hole corresponding to the slit of the pixel electrode;
a black matrix on the second substrate;
a color filter layer on the black matrix;
a common electrode on the color filter layer; and
a liquid crystal layer between the pixel electrode and the common electrode.

17. A method of fabricating an LCD device, comprising:
forming a gate line and a data line on a first substrate, the gate line crossing the data line to define a pixel region;
forming a thin film transistor connected to the gate line and the data line;
forming a pixel electrode connected to the thin film transistor, wherein the pixel electrode has a slit at a central portion;
forming an auxiliary electrode corresponding to the slit of the pixel electrode, wherein the auxiliary electrode is formed under the pixel electrode;
forming a distortion pattern under the pixel electrode;
forming a passivation layer between the pixel electrode and the auxiliary electrode, wherein the passivation layer has a slit hole corresponding to the slit of the pixel electrode;
forming a black matrix on a second substrate;
forming a color filter layer on the black matrix;
forming a common electrode on the color filter layer;
attaching the first and second substrates such that the pixel electrode and the common electrode face to each other; and
forming a liquid crystal layer between the pixel electrode and the common electrode.

18. The method according to claim 17, wherein the pixel electrode has a boundary portion surrounding the central portion, and the distortion pattern is disposed at the boundary portion.

19. The method according to claim 17, wherein the pixel electrode has a concave portion corresponding to the slit hole.

20. The method according to claim 17, wherein the pixel electrode has a boundary portion surrounding the central portion, and the distortion pattern is disposed at the central portion.

21. The method according to claim 20, further comprising forming an auxiliary electrode at the boundary portion under the pixel electrode.

22. The method according to claim 21, further comprising forming a passivation layer between the pixel electrode and the auxiliary electrode, wherein the passivation layer has a hole corresponding to the auxiliary electrode.

23. The method according to claim 22, wherein the pixel electrode has a concave portion corresponding to the hole.

24. The method according to claim 17, wherein forming the distortion pattern comprises:
forming a first buffer pattern; and
forming a second buffer pattern over the first buffer pattern.

25. The method according to claim 24, wherein the first buffer pattern is simultaneously formed with the gate line, and the second buffer layer is simultaneously formed with the data line.

26. The method according to claim 24, wherein the thin film transistor includes a gate electrode, a semiconductor layer, a source electrode, and a drain electrode.

27. The method according to claim 26, wherein forming the second buffer pattern comprises:
forming a first layer simultaneously with the semiconductor layer; and
forming a second layer simultaneously with the source and drain electrodes.

28. A method of fabricating an array substrate for an LCD device, comprising:

forming a gate line including a gate electrode, an auxiliary electrode, and a first buffer pattern on a substrate;

forming a data line including a source electrode, a drain electrode spaced apart from the source electrode, and a second buffer pattern corresponding to the first buffer pattern, the data line crossing the gate line to define a pixel region;

forming a passivation layer on the data line, the source electrode, the drain electrode and the second buffer pattern, the passivation layer having a drain contact hole exposing the drain electrode; and forming a pixel electrode on the passivation layer, the pixel electrode being connected to the drain electrode through the drain contact hole.

* * * * *